April 18, 1944.    A. C. PLEWES    2,346,783
PURIFICATION OF ETHERS OF DIETHYLENE GLYCOL
Filed June 26, 1941
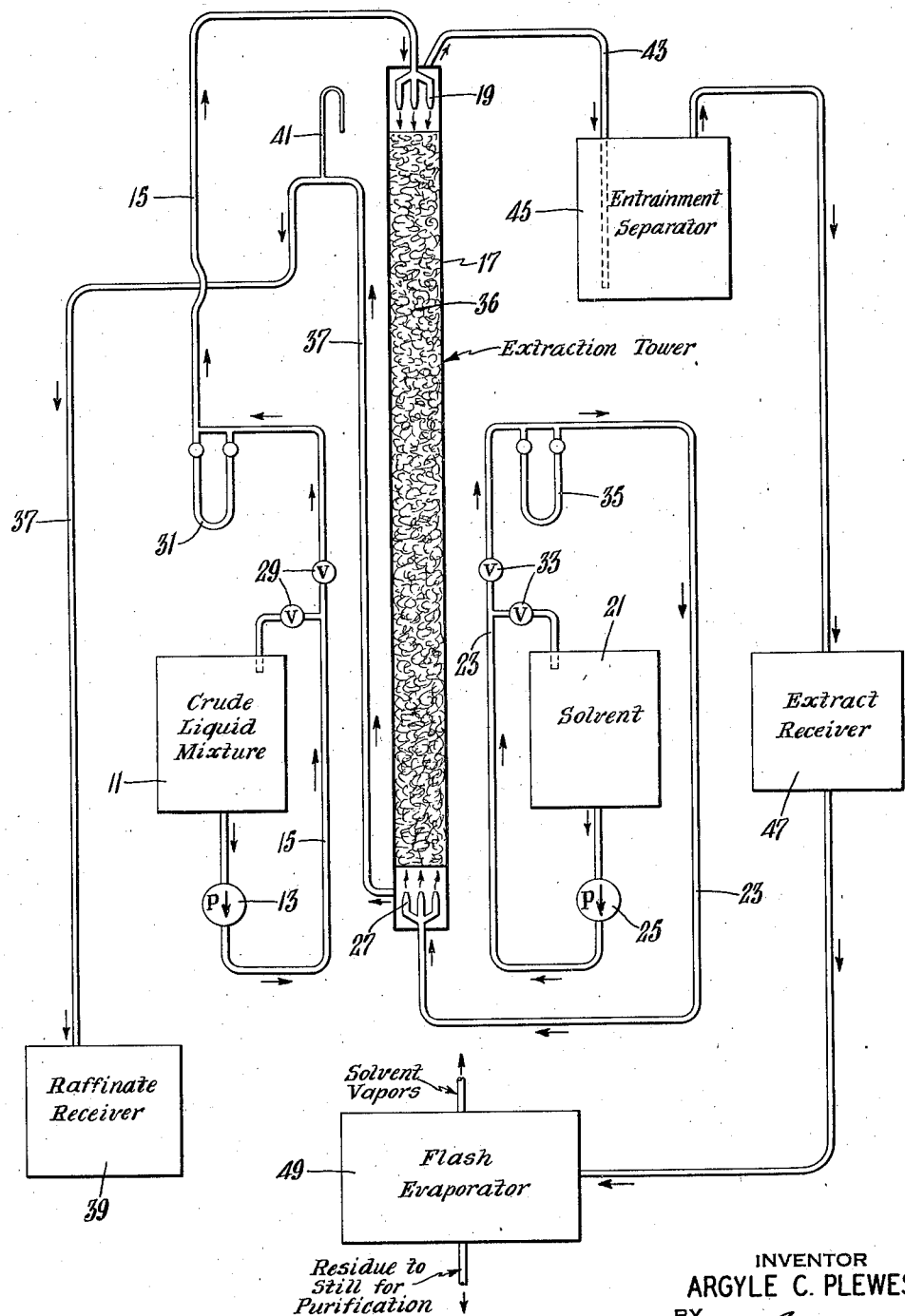
INVENTOR
ARGYLE C. PLEWES
BY
ATTORNEY Patented Apr. 18, 1944

2,346,783

UNITED STATES PATENT OFFICE 2,346,783

PURIFICATION OF ETHERS OF DIETHYLENE GLYCOL

Argyle Campbell Plewes, South Charleston, W. Va., assignor to Carbide and Carbon Chemicals Corporation, a corporation of New York Application June 26, 1941, Serial No. 399,843

12 Claims. (Cl. 260—616)

The present invention relates to a method of purification of ethers of diethylene glycol; and more especially it concerns the production of alkyl ethers of diethylene glycol of relatively high purity, containing little or none of the ethylene glycol commonly present in such ethers as an impurity. The invention has especial utility for the purification of the monomethyl, monoethyl and monobutyl ethers of diethylene glycol, which are produced by various processes, such as that described in United States Patent No. 1,633,927 of J. G. Davidson.

Many industries today are assimilating large quantities of various ethers of diethylene glycol for use as plasticizers and textile conditioners, and for many other purposes. However, as a result of the procedure used in the production of the glycol ethers, the technical grades of these compounds contain ethylene glycol. The presence of the latter seriously interferes with the use of these glycol ethers for many important purposes. Thus, when esterification of the mixture of an ether of diethylene glycol and ethylene glycol is undertaken, the glycol reacts with much of the acid used for the esterification, thereby forming a tarry mass and causing a serious loss in esterification efficiency. Moreover the glycol polymer thus formed occludes or holds back considerable quantities of the esters of the diethylene glycol ethers when the esterified mixture is purified by distillation.

Heretofore various procedures have been employed with some success for the removal of the glycol from ethers of diethylene glycol, involving distillation procedures. The lower monoalkyl ethers of diethylene glycol, such as the monomethyl, monoethyl, and monobutyl ethers, form constant boiling mixtures with ethylene glycol which can be separated by distillation processes only by a complicated procedure requiring a great deal of time and expense since the separation involves the use of high reflux ratios. Moreover it has not been possible by distillation procedures to produce a purified monoalkyl ether of diethylene glycol that contains less than 5% of ethylene glycol.

Among the more important objects of this invention are: the production of a monoalkyl ether of diethylene glycol having less than 5% ethylene glycol; to provide in novel manner for the removal of ethylene glycol from mixtures thereof with monoalkyl ethers of diethylene glycol; and to provide in novel manner for the application of an extraction technique to the separation of the aforesaid ethers from mixtures thereof with ethylene glycol.

According to the invention a liquid mixture containing a monoalkyl ether of diethylene glycol, preferably one containing from 5 to 9 carbon atoms, and ethylene glycol, is extracted with a saturated hydrocarbon solvent or mixture of such solvents, which solvent selectively dissolves said glycol ethers, but does not substantially dissolve the glycols, and does not form azeotropic mixtures with the latter. Preferably solvents boiling within the range between 0° C. and 150° C. under atmospheric pressure are used.

Various extraction systems may be employed. Thus, while the conventional mixing tanks and settling chambers may be employed for intermittent operation, the present invention is particularly adapted for service as a continuous process wherein the mixture to be extracted is passed through a column in countercurrent contact with the hydrocarbon solvent used.

Various temperatures may be utilized for the extraction, depending upon the nature of the extraction system used. For example, the extraction of monomethyl and monoethyl ethers of diethylene glycol from the ethylene glycol is conveniently performed at temperatures ranging between —20° C. and 30° C. The extract, composed of the hydrocarbon solvent plus the extracted ether of diethylene glycol, is withdrawn from the extraction vessel and passed through an entrainment separator wherein entrained glycol is removed. The residual extract is then stripped from the solvent, preferably in a flash evaporator or the equivalent; and the recovered solvent reused in the process. The residual alkyl ether of diethylene glycol is redistilled, preferably under vacuum in a separate distillation column, thereby removing additional glycol and color bodies.

The paraffin and cycloparaffin hydrocarbons have been found particularly efficacious in the process. The use of normal hexane generally appears to provide the highest degree of separation. Numerous other saturated aliphatic hydrocarbons having three or more carbon atoms have proven very satisfactory. Among these may be mentioned the various hexanes and heptanes; and gasoline such as that on the market produced by the well-known "Gyro" process involving the vapor phase cracking of hydrocarbon oils; and a nonane hydrocarbon fraction of boiling range 125° C.–150° C. Butane may be employed as a solvent, preferably at temperatures around 20° C. under a pressure of around 30 pounds per square inch gauge. Cyclobutane and cyclohexane likewise conveniently may be employed as the solvent. Certain benzenoid hydrocarbons, such as benzene and toluene, are much less suitable as solvents and, while useful, provide relatively little advantages in the present process.

The hydrocarbon solvents utilized in the process are preferably given a preliminary treatment to remove sulfur, since for most efficient extraction a solvent which is sulfur-free, or approximately so, provides outstanding results. Thus the hydrocarbon preferably is treated with ½ volume of a 95% solution of sulfuric acid per volume of the hydrocarbon. The acid layer which separates is removed, and the acid treatment of the hydrocarbon is repeated if necessary. The hydrocarbon solvent is then freed from acid by a treatment with caustic soda; and is washed with water until free from caustic soda, being then ready for use in the process.

Referring to the accompanying drawing wherein is shown diagrammatically one form of apparatus adapted for the practice of the invention, numeral 11 designates a feed tank adapted to contain a mixture of a monoalkyl ether of diethylene glycol and ethylene glycol from which the former is to be isolated and purified. The crude liquid mixture is pumped from tank 11 by pump 13 through line 15 to the upper end of an extraction tower 17, and is introduced into the latter through a plurality of atomizing nozzles 19. This mixture passes downward in the extraction tower countercurrent to a stream of hydrocarbon solvent flowing from solvent reservoir 21 through line 23 under action of pump 25 to a plurality of spray nozzles 27 disposed in the base of extraction tower 17. A pair of valves 29 controls the amount of liquid mixture fed to the nozzles 19; and the quantity of liquid flowing through line 15 is indicated by flowmeter 31. Likewise a system of valves 33 controls the amount of solvent flowing through line 23 to the extractor; and the rate of flow of the solvent is indicated by flowmeter 35. The tower 17 is packed with one-half inch outside diameter carbon Raschig rings 36. Diffusional exchange occurs between the upwardly flowing solvent and downwardly flowing liquid mixture throughout the length of the packed tower 17. This flow is caused by the differences in gravity that exist between the solvent and the crude mixture being treated. The extracted liquid mixture is withdrawn from the base of the tower through conduit 37 to raffinate reservoir 39. The conduit 37 is vented to the atmosphere through vent pipe 41, and the vent therein is so regulated in height that the liquid mixture to be extracted is made the continuous phase. The extract, i. e., the hydrocarbon solvent containing extracted monoalkyl ether of diethylene glycol, overflows from the top of the column and passes through conduit 43 to an entrainment separator 45 wherein entrained ethylene glycol separates and settles. The residual extract then flows to extract reservoir 47. Periodically or continuously the extract is delivered to a flash evaporator 49 or its equivalent where the bulk of the hydrocarbon solvent is removed, and may be returned to solvent tank 21. The residue then is distilled in a separate column for the removal of color and any residual small amounts of ethylene glycol. Preferably such distillation is conducted under high vacuum; and a suitable heads fraction containing any of the hydrocarbon solvent therein is removed, after which the residual diethylene glycol ether is recovered.

The following examples are intended merely for the purpose of illustrating the invention.

*Example 1*

A quantity of a high-gravity liquid mixture of monoethyl ether of diethylene glycol containing 25% of ethylene glycol was intimately mixed and extracted with normal hexane at 20° C. and under atmospheric pressure in the proportion of 10 volumes of hexane per volume of the liquid mixture. The hexane had been previously treated with sulfuric acid in the manner hereinbefore described. The extraction was performed in a packed column similar to tower 17, which was ten feet in height. The solvent entered the base of the column and passed upwardly countercurrent to the flow of the mixture being extracted. The resultant extract contained 6% of the solute. Upon distillation of the extract in a packed column provided with five plates, at a pressure of 15 pounds per square inch, gauge, the hexane was removed and recovered. The residual monoethyl ether of diethylene glycol then was redistilled in a fractionating column containing the equivalent of ten theoretical plates, under a pressure of 20 mm. of mercury, absolute. A suitable heads fraction containing hexane was removed, after which the diethylene glycol ether was distilled and recovered. The ethylene glycol content of the thus purified monoethyl ether of diethylene glycol averaged around 0.5%.

*Example 2*

Following the general procedure recited in Example 1, a high-gravity mixture of crude monomethyl ether of diethylene glycol containing 7.5% ethylene glycol was extracted with normal hexane at 25° C. and atmospheric pressure, the proportions of solvent and high-gravity mixture being the same as that recited in Example 1. The resultant extract contained 3.8% solute. The hexane was removed from the extract in the manner set forth in the last example, after which the residual mixture was distilled under a pressure of 10 mm. of mercury, absolute, in a column containing the equivalent of ten theoretical plates. After removing the head cut there was obtained a fraction representing high quality monomethyl ether of diethylene glycol which contained 0.8% of ethylene glycol.

Following the general procedure set forth in Example 2, a high-gravity monobutyl ether of diethylene glycol containing 35% ethylene glycol was extracted with normal hexane, using 4 volumes of the solvent per volume of the mixture being extracted. The resultant extract contained 10% solute. After removal of the hexane from the extract in the manner described in Example 2, the residue was distilled under a pressure of 40 mm. of mercury, absolute, thereby yielding a monobutyl ether of diethylene glycol fraction that contained 3.5% ethylene glycol.

Generally similar results are secured by substituting for normal hexane in Example 1, other hexanes; normal heptane, or other heptanes having boiling points within the range from 90° to 99° C.; octanes; and nonanes, such as a nonane fraction having a boiling range between 125° C. and 150° C. However, normal hexane is preferred because of the low solubility of ethylene glycol therein.

The term "high-gravity" applied herein to various crude mixtures of ethylene glycol and diethylene glycol ethers is intended to designate such mixtures which contain more than 2% of ethylene glycol.

The invention is susceptible of modification within the scope of the appended claims.

I claim:

1. Process for separating and recovering a diethylene glycol monoalkyl ether from a mixture thereof containing an alkylene glycol, which comprises extracting such mixture with a saturated aliphatic hydrocarbon which selectively dissolves said ether and which does not form azeotropic mixtures with the alkylene glycol and is substantially immiscible with the latter, and separately recovering from the resultant extract the diethylene glycol monoalkyl ether.

2. Process as defined in claim 1 wherein said aliphatic hydrocarbon is selected from the group consisting of the paraffin hydrocarbons and the cycloparaffin hydrocarbons.

3. Process for separating and recovering a diethylene glycol monoalkyl ether from a mixture containing the same and ethylene glycol, which comprises passing a flowing stream of such mixture in countercurrent contact with a volatile saturated aliphatic hydrocarbon selected from the group consisting of the paraffins and the cycloparaffins, isolating the resultant hydrocarbon solution of said ether, and separately recovering from the extract a relatively pure diethylene glycol monoalkyl ether.

4. Process for separating and recovering a diethylene glycol monoalkyl ether from a mixture containing the same and ethylene glycol, which comprises extracting the mixture with a volatile saturated aliphatic hydrocarbon solvent, thereby forming two liquid layers, separating said layers, removing the solvent from the layer containing the same, and thereafter recovering from the last-named layer the monoalkyl ether of diethylene glycol.

5. Process as defined in claim 1 wherein the hydrocarbon solvent is at least approximately sulfur-free.

6. Process as defined in claim 1 wherein the hydrocarbon solvent is a paraffin hydrocarbon containing between 4 and 10 carbon atoms in the molecule.

7. Process as defined in claim 1 wherein the hydrocarbon solvent is a cycloparaffin.

8. Process as defined in claim 1 wherein the extraction is conducted under superatmospheric pressure, and a normally gaseous paraffin hydrocarbon is used as the solvent.

9. Process for separating and recovering a diethylene glycol monoalkyl ether from a mixture containing the same and ethylene glycol, which comprises extracting such mixture with a volatile saturated aliphatic hydrocarbon which selectively dissolves said glycol ether and which does not form an azeotropic mixture with said ethylene glycol and is substantially immiscible with the latter, and separately recovering from the resultant extract the diethylene glycol monoalkyl ether present therein.

10. Process as defined in claim 9 wherein said saturated hydrocarbon boils within the range between 0° and 150° C. under atmospheric pressure, and wherein the extraction is conducted under superatmospheric pressure.

11. Process as defined in claim 9 wherein the volatile hydrocarbon solvent is selected from the group consisting of the paraffins and the cycloparaffins.

12. Process as defined in claim 9 wherein the saturated hydrocarbon is at least approximately sulfur-free.

ARGYLE CAMPBELL PLEWES.

CERTIFICATE OF CORRECTION.

Patent No. 2,346,783.　　　　　　　　　　　　　　　　April 18, 1944.

ARGYLE CAMPBELL PLEWES.

It is hereby certified that error appears in the printed specification of the above numbered patent requiring correction as follows: Page 3, first column, line 10, claim 1, after the words "with a" insert --volatile--; and that the said Letters Patent should be read with this correction therein that the same may conform to the record of the case in the Patent Office.

Signed and sealed this 30th day of May, A. D. 1944.

Leslie Frazer

(Seal)

Acting Commissioner of Patents.